United States Patent [19]

Berlec

[11] Patent Number: 4,524,302
[45] Date of Patent: Jun. 18, 1985

[54] GENERAL SERVICE INCANDESCENT LAMP WITH IMPROVED EFFICIENCY

[75] Inventor: Ivan Berlec, South Euclid, Ohio

[73] Assignee: General Electric Company, Schenectady, N.Y.

[21] Appl. No.: 519,165

[22] Filed: Aug. 1, 1983

[51] Int. Cl.³ ............................................. H01K 1/34
[52] U.S. Cl. .................................. 313/579; 313/580; 313/578
[58] Field of Search ............... 313/578, 579, 580, 635, 313/255, 258

[56] References Cited

U.S. PATENT DOCUMENTS 3,515,930 6/1970 Walsh et al. ......................... 313/578
4,463,277 7/1984 DeCaro ............................... 313/579

FOREIGN PATENT DOCUMENTS

| WO84/00080 | 1/1984 | PCT Int'l Appl. . |
| 998322 | 7/1965 | United Kingdom . |
| 1043172 | 9/1966 | United Kingdom . |
| 1054423 | 1/1967 | United Kingdom . |
| 1463939 | 2/1977 | United Kingdom . |
| 1473599 | 5/1977 | United Kingdom . |
| 1582685 | 1/1981 | United Kingdom . |

Primary Examiner—Arthur Kellogg
Attorney, Agent, or Firm—John P. McMahon; Philip L. Schlamp; Fred Jacob

[57] ABSTRACT

A high efficiency general service incandescent lamp is disclosed. The disclosed improved general service incandescent lamp has an outer and an inner envelope. The inner envelope has a relatively small housing containing a halogen gas and a relatively high pressure efficient fill-gas and in which a low voltage filament is spatially disposed therein.

20 Claims, 5 Drawing Figures

U.S. Patent   Jun. 18, 1985   Sheet 1 of 2   4,524,302
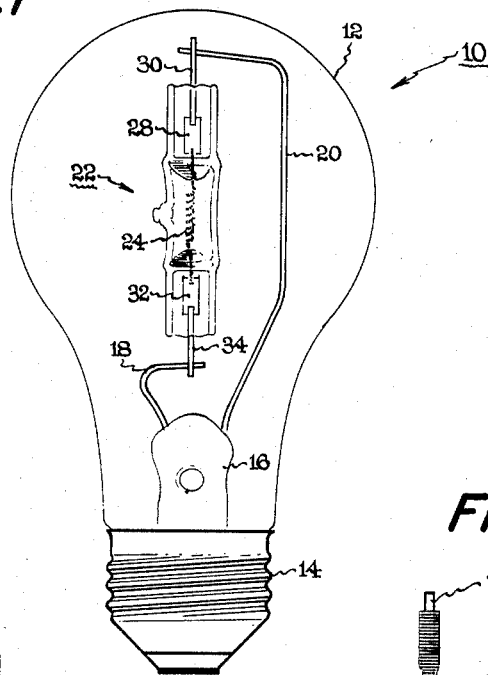
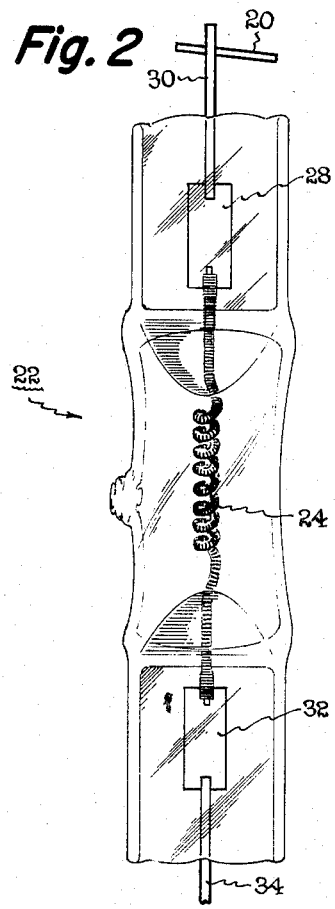
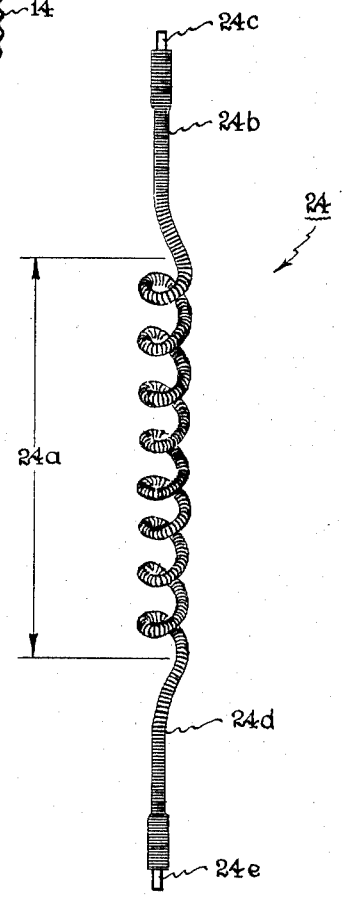

GENERAL SERVICE INCANDESCENT LAMP WITH IMPROVED EFFICIENCY

CROSS REFERENCE TO RELATED APPLICATIONS

U.S. patent application Ser. Nos. 519,162, 519,162 and 519,163 herewith, respectively for "Higher Efficiency Incandescent Lighting Unit" of W. Brinn et al and "Improved Incandescent Lamp" of C. Tschetter et al, and "Incandescent Lamp Utilizing an Integral Cylindrical Transparent Heat Mirror" of L. W. Otto all assigned to the same assignee as the present invention, are all related to the present invention.

BACKGROUND OF THE INVENTION

This invention is related to a general purpose incandescent lamp, and more particularly, to a higher efficiency general purpose incandescent lamp comprising an outer bulb filled with an inert gas or evacuated and an inner envelope containing a halogen atmosphere along with a relatively high pressure fill-gas and a spatially disposed low voltage filament.

The continuing pursuit of improving the efficiency of lamps is of increasing importance due to the increasing cost of energy. One of the family of lamps in which the efficiency is desired to be improved is the incandescent lamp. Incandescent lamps, although having efficiency ratings lower than those of fluorescent and high intensity discharge lamps, have many attractive features, such as, low cost, compact size, instant light, dimmability, convenience, pleasing spectral distribution, and millions of existing sockets in the homes of users who have become accustomed to the pleasing incandescent type lighting.

Incandescent lamps are of various types, the most well-known is the A-line type which is typically termed a general service incandescent lamp and has a wide range of wattage ratings. Still further, the general purpose incandescent lamp typically has a tungsten type filament.

The tungsten filament is also commonly utilized in relatively more expensive but more efficient special purpose halogen type lamps. In typical operation over an extended period of time, some tungsten of the tungsten type filament evaporates and becomes deposited on the bulb wall, which, in turn, typically causes a blackening of the bulb wall, which, in turn, decreases the lumen output thereby decreasing the lumens per watt or efficacy of the lamp. It is known that the blackening of the bulb wall caused by the tungsten type filament may be substantially reduced by providing a halogen type gas atmosphere surrounding the tungsten type filament which provides a regenerative (transport) cycle that keeps the bulb wall clean resulting in improved lumen output. It is considered desirable that means for improving the efficacy, such as, a halogen type atmosphere employed in a relatively expensive special purpose halogen type lamp be adapted to a general service incandescent lamp while maintaining certain of the attractive features of the relatively inexpensive general purpose incandescent lamp.

The operation of a tungsten filament may be further improved relative to the efficacy of the incandescent lamp by housing the filament in a suitable efficient fill-gas, such as xenon, krypton or argon, raised to a relatively high pressure. The high pressure fill-gas improves the operation of the filament by reducing the evaporation of the tungsten material from the filament and also allows raising of the filament operating temperature, both contributing to improving the efficacy of the lamp. The arc-out resistance of the filament, that is, the resistance of the filament to being burned out by an arc condition within its housing, may be improved by the addition of some nitrogen gas. It is considered desirable to provide an incandescent lamp utilizing the efficacy gain realized by the high pressure fill gas of the xenon, krypton or argon, and to improve the arc-out resistance of the filament by the addition of the nitrogen gas.

Further improvements to the incandescent lamp are also desired. For example, it is desired that the life of the incandescent lamp be extended while still maintaining the efficacy of the lamp. As previously mentioned, the increase of fill-gas pressure and the use of xenon or krypton improves the operation of the filament which correspondingly increases the life of the incandescent lamp and also increases the efficacy of the incandescent lamp.

Another means for extending the life of an incandescent lamp is to reduce the operating voltage of the filament, but it is desired that this reduction of operating voltage be accomplished while maintaining the wattage and efficacy of the lamp. It is considered desirable to provide a filament that provides extended life and maintains the wattage of the lamp and even increases the efficacy of the incandescent lamp while operated at a low voltage.

It is considered desirable to provide a plurality of means which all extend the life of the incandescent lamp and which all maintain and even increase the efficacy of the incandescent lamp.

Accordingly, objects of the present invention are to provide a relatively inexpensive general service incandescent lamp having, (1) an efficient fill gas such as xenon, krypton, or argon all of a relatively high pressure and both the efficient fill-gas and the relatively high pressure contributing to improving the operation of the filament, (2) a relatively high pressure fill-gas having an addition of nitrogen so as to improve the arc-out resistance of the filament, (3) a filament operated at a low voltage so as to extend the life of the incandescent lamp while still maintaining the wattage of the lamp and even increasing the efficacy of the lamp, (4) a halogen gas atmosphere to provide a transport cycle for the evaporated tungsten, and (5) combining the relatively high pressure fill-gas having the nitrogen additive, the low voltage filament and the halogen atmosphere in such a manner that the overall effect extends the life of the incandescent lamp and provides an improved efficacy both greater than the expected gains usually realized from the individual contributors.

These and other objects of the present invention will become apparent upon consideration of the following description taken in conjunction with the accompanying drawings.

SUMMARY OF THE INVENTION

The present invention is directed to an improved high efficiency general service incandescent lamp having an outer envelope and an inner envelope which has spatially disposed therein a low voltage filament and an atmosphere containing halogen and a relatively high pressure fill-gas.

In accordance with one embodiment of the invention, an improved general service incandescent lamp comprises, (a) an electrically conductive base; (b) an outer envelope hermetically sealed to the base; (c) an inner envelope spatially disposed within the outer envelope and containing a halogen gas and a relatively high pressure fill-gas selected from the group consisting of xenon, krypton and argon and mixtures of these inert gases; and (d) a tungsten filament spatially disposed within the inner envelope and specially adapted to be effectively energizable for normal operating wattage rating at a reduced voltage relative to a typical household power source.

The features of the invention believed to be novel are set forth with particularity in the appended claims. The invention itself, however, both as to its organization and operation, together with further objects and advantages thereof, may best be understood by reference to the following description taken in conjunction with the accompanying drawings.

BRIEF DESCRIPTION OF THE DRAWINGS

FIG. 1 shows an improved general service incandescent lamp in accordance with one embodiment of the present invention.

FIG. 2 shows the mounting of the filament within the inner envelope of the general service incandescent lamp of the present invention.

FIG. 3 shows the filament of the general service incandescent lamp of the present invention.

DETAILED DESCRIPTION OF THE PREFERRED EMBODIMENTS

Figure 4:
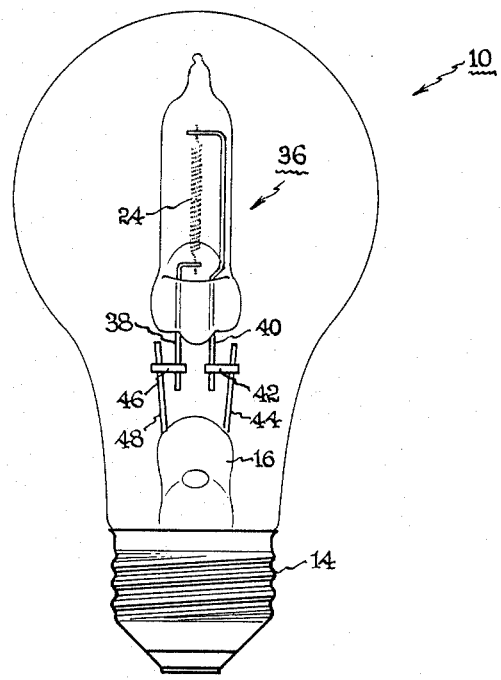
FIG. 4 shows an improved general service incandescent lamp having a single-ended inner envelope in accordance with another embodiment of the present invention.

FIG. 1 shows an improved general service incandescent lamp 10 having an hermetically sealed outer envelope 12 sealed within an electrically conductive base 14. The outer envelope 12 may be filled with an inert gas, such as nitrogen at a typical pressure of 400 Torr or it may be evacuated. The outer envelope 12 is formed of a translucent material and has a shape typically known as A-line type. FIG. 1 further shows an inner envelope 22 which contains a halogen type gas and a relatively high pressure gas selected from the group consisting of xenon, krypton, argon and mixtures of these gases, with a nitrogen gas additive to the high pressure gas. The inner envelope 22 is spatially disposed within the outer envelope 12. The inner envelope 22 has a filament 24 spatially disposed therein. The filament 24 is specially adapted to be effectively energizable for normal operating wattage rating at a reduced voltage relative to a typical household power source.

The reduced voltage is of either an A.C. type or a D.C. type and is applied across the filament 24. The reduced voltage is developed by an external means (not shown). The details of the external means are not considered part of the present invention, an external means such as a voltage converter need only supply a reduced A.C. or D.C. voltage relative to the A.C. power source, such as a typical household power source, to such values to be described hereinafter. For details of such a means reference may be made to the hereinbefore-mentioned U.S. patent application Ser. No. 519,162 of Brinn et al filed concurrently with the application of the present invention.

The general service incandescent lamp 10 of FIG. 1 has two electrical lead and support members 18 and 20 which are rigidly disposed within the outer envelope 12 by a stem 16. One end of the support members 18 and 20 extends through the stem and makes electrical connection with appropriate electrical contact portions of the metallic base 14. The support members 18 and 22 provide the structure for mounting the inner envelope 22. The inner envelope 22 is shown more clearly in FIG. 2.

FIG. 2 shows the inner envelope 22 as being of a double-ended type and as housing the filament 24 spatially disposed in an axial manner relative to the lamp 10. The inner envelope 22 is comprised of a relatively thick, about 1 mm. thick, translucent material such as quartz or glass. The inner envelope 22 formed of quartz or glass tubing may have an outer diameter in the range of 8 to 15 millimeters having a volumetric capacity in the range of approximately 0.33 to 5.0 cubic centimeters. As is to be further described hereinafter, for a double-ended inner envelope 22 for various embodiments of the present invention may comprise either a T2½ or T3 quartz tube having outer diameters of approximately 8 millimeters or approximately 10 millimeters, respectively, and volumes of approximately 0.34 cubic centimeters or approximately 0.8 cubic centimeters respectively. Glass tubes having dimensions corresponding to the quartz tubes T2½ and T3 may also be used in the practice of this invention. Further, to be described hereinafter, single-ended inner envelopes may be quartz or glass tubing having a volumetric capacity in the range of approximately 1.5 to 5.0 cubic centimeters. Still further, the single-ended inner envelope may have an outside diameter in the range of approximately 11 mm. to 15 mm. for both quartz or glass tubing.

The relatively thick material of the inner envelope 22 provides for thick walls, relative to outer envelope walls of a general service incandescent lamp, for enclosing the filament 24. The relatively thick walls of the inner envelope 22 are advantageous in that the walls confine a fill-gas of a relatively high pressure, such as 1500 to 7000 Torr at room temperature. The fill-gas consists of xenon, krypton, argon or mixtures of these gases having a nitrogen additive. The relatively small volumetric capacity of the inner envelope 22 is advantageous in that it requires only a small volume of the relatively expensive halogen gas and a small volume of the more efficient relatively expensive gases of xenon, krypton and argon. The halogen gas acts as a regenerative agent for keeping the walls of the inner envelope clean. Still further, the relatively small volume of the inner envelope 22 in combination with the thickness of the wall provides structural strength to the inner tube and thus is beneficial to resist tube rupturing. The lower volume of the inner envelope 22 provides a relatively low pressure (x) volume (P·V) quantity thereby lowering the released stored energy in the event of bulb rupturing.

From FIG. 2 it should be noted that the filament 24 is arranged and encapsulated within the inner envelope 22 without any support members. The inner envelope 22 of FIG. 2 also encapsulates two molybdenum foil members 28 and 32 and portions of molybdenum leads 30 and 34 as shown in FIG. 2. The exposed portion of molybdenum leads 30 and 34 are respectively connected to support members 20 and 18. The encapsulated molybdenum foil members 28 and 32 provide the means for interconnecting the filament 24 between leads 30 and 34 respectively. The molybdenum foils 28 and 32 due to their foil type shape allow for hermetic sealing of the quartz type inner envelope 22 to the molybdenum leads 30 and 34 respectively. For other embodiments of the inner envelope 22 utilizing a glass type tube, the molybdenum foils 28 and 32 may be omitted and the glass tube inner envelope 22 may be sealed to rod-like molybdenum members 30 and 34 which would be directly connected to opposite ends of the filament 24. The filament 24 is shown most clearly in FIG. 3.

FIG. 3 shows a filament 24 as being of a coiled-coil type which is used for various embodiments of the general service incandescent lamp of the present invention. The general service incandescent lamp 10 may also utilize for various embodiments a filament 24 of a single-coil type. Various coil types along with various lamp ratings that may be utilized in the practice of the present invention for general service incandescent lamp 10 are given in Table 1.

TABLE 1

| LOW VOLTAGE COILS | |
|---|---|
| Lamp Rating | Coil Type |
| 150W-48V | Coiled Coil |
| 100W-84V | Coiled Coil |
| 100W-48V | Coiled Coil |
| 75W-60V | Coiled Coil |
| 75W-30V | Coiled Coil |
| 75W-27V | Single Coil |
| 60W-50V | Coiled Coil |
| 60W-26V | Coiled Coil |
| 60W-24V | Coiled Coil |
| 50W-84V | Coiled Coil |
| 50W-26V | Coiled Coil |

Further details related to the various coils for filament 24 of the general service incandescent lamp 10 are to be described hereinafter with regard to Tables 2, 5, 6 and 7. For the sake of brevity, a filament 24 of a coiled-coil type shown in FIG. 3 is described hereinafter with the understanding that most of the structural details of a coiled-coil type filament 24 encompasses the less complicated single coil type filament 24 of the present invention.

FIG. 3 shows the coiled-coil filament 24 as having a coiled body 24a, two oppositely located legs 24b and 24d and two oppositely located spuds 24c and 24e internally affixed within the oppositely located legs 24b and 24d respectively. Spuds 24c and 24e may be either molybdenum or tungsten rods. Spuds 24c and 24e may be used to facilitate the welding process or clamping process.

Figure 5:
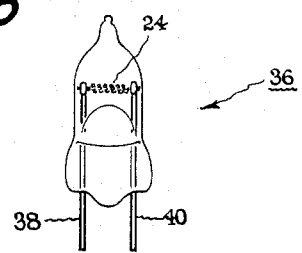
FIG. 5 shows an improved general service incandescent lamp similar to that of FIG. 4 but having its filament spatially disposed within the inner envelope in a transverse manner.

The filament 24 of FIG. 3 may also be spatially disposed within a single-ended inner envelope 36 as shown in FIG. 5. The filament 24 is connected across lead and support members 38 and 40. The lead and support member 38 is extended through stem 16 and connected to an appropriate electrical portion of the metallic base 14 by lead and support members 46 and 48 shown in FIG. 4, whereas, the lead and support member 40 is extended through stem 16 and connected to an appropriate electrical portion of the metallic base 14 by lead and support members 42 and 44 also shown in FIG. 4.

For short coil lengths the filament 24 of FIG. 3 may be mounted transversely within the inner envelope 36 as shown in FIG. 5. The filament 24 shown in FIG. 5 is preferably of the coil-coiled type but may also be of the single-coil type. The inner envelope 36 of FIG. 5 may be arranged within the outer envelope 12 in a manner similar to that shown in FIG. 4.

In general, the filament 24 of FIG. 3 is of a low voltage type and formed of tungsten. The diameter of filament 24 has various dimensions selected relative to the desired wattage and low voltage ratings of the general service incandescent lamp 10. The diameter of filament 24 relative to the various wattage and voltage ratings and the wire length of the filament 24 exposed within the inner envelopes 22 and 36 are given in Table 2.

TABLE 2

| ACTIVE WIRE DIMENSIONS OF GENERAL INCANDESCENT LAMPS 10 | | |
|---|---|---|
| Lamp | Wire Diameter, mils | Wire Length, mm |
| 60W-26V | 4.75 | 174.3 |
| 75W-30V | 4.75 | 184.1 |
| 100W-48V | 4.48 | 266.9 |
| 150W-48V | 5.83 | 300.1 |

The low voltage filaments of Table 2 have larger wire diameters and shorter active wire lengths relative to those of corresponding filaments of typical A-line lamps operated at 120 volts having corresponding wattage ratings as shown in Table 3.

TABLE 3

| ACTIVE WIRE DIMENSIONS OF TYPICAL 120V A-LINE LAMPS | | |
|---|---|---|
| Lamp | Wire Diameter, mils | Wire Length, mm |
| 60W | 1.8 | 517.2 |
| 75W | 2.1 | 541.4 |
| 100W | 2.5 | 555.4 |
| 150W | 3.3 | 632.3 |

A comparison between Tables 2 and 3 reveals that the filaments of Table 2 are of much larger wire diameter and of a much shorter wire length relative to Table 3. The sag problem and the coil distortions are reduced or eliminated in the filaments 24 of Table 2 because the filaments of Table 2 have the relatively large diameters and have relatively short active wire lengths. The shorter active filament lengths characteristic along with the large diameter of the filament 24 provide a more compact incandescent light source while (1) also providing superior mechanical strength, and (2) longer life relative to the filaments of typical incandescent lamp. The longer life of my improved general service incandescent lamp is to be further described hereinafter with regard to additional advantages of my invention.

It should now be appreciated that the present invention provides the incandescent lamp art with a filament 24 of larger wire diameter but shorter wire length which serves as a sturdy and compact incandescent light source housed within a small container provided by the inner envelope 22 or 36 and containing halogen and high pressure fill gases such as xenon, krypton, argon or mixtures of these gases having a nitrogen additive all of which enhance the operation of the filament 24 and extend its life, which, in turn, provides the general service incandescent lamp 10 having enhanced or improved efficacy and extended life.

In order that the efficacy improvement of the general service incandescent lamp 10 of FIG. 1 may be more fully appreciated reference is first made to Table 4 showing the performance characteristics of typical A-line incandescent lamps.

TABLE 4
PERFORMANCE CHARACTERISTICS TYPICAL A-LINE LAMPS

| Volts | Watts | Lumens | L.P.W. | Life, Hours |
|---|---|---|---|---|
| 120 | 60 | 870 | 14.5 | 1000 |
| 120 | 75 | 1190 | 15.9 | 750 |
| 120 | 100 | 1750 | 17.5 | 750 |
| 120 | 150 | 2850 | 19.0 | 750 |

Table 4 shows the typical performance of the incandescent lamps for various wattage ratings having applied across the filament a 120 volt A.C. operating voltage. Further, the outer bulb of the incandescent lamps of Table 4 have a fill gas comprised of 95% argon and 5% nitrogen at a pressure of 600 Torr. Further still, Table 4 shows two primary performance characteristics, (1) LPW which represents the lumens per watt, and (2) life hours which is the typical expected life of the lamp. As is known, the LPW and the life hours are interrelated in that the life of the lamp may be extended by correspondingly reducing the LPW characteristic of the lamp for a specified wattage and voltage rating.

Reference is now made to Table 5 showing the improved performance characteristics gained by the general service incandescent lamp of the present invention relative to the performance characteristics shown in Table 4.

TABLE 5
GENERAL SERVICE INCANDESCENT LAMPS 10 PERFORMANCE CHARACTERISTICS

| Lamp | Volts | Watts | Lumens | LPW | Life in Hours |
|---|---|---|---|---|---|
| 60W-26V | 26.0 | 60.35 | 1186 | 19.66 | 8678 |
| 75W-30V | 30.0 | 74.36 | 1758 | 23.64 | 2393 |
| 100W-48V | 48.0 | 101.2 | 2115 | 20.90 | 3242 |
| 150W-48V | 48.0 | 150.5 | 3323 | 22.08 | 4067 |

The 60W-26V and the 75W-30V lamps of Table 5 contain a gas atmosphere of a relatively high pressure of 2700 Torr, within the inner envelope 22 or 36, comprised of about 99.9% xenon and 0.1% of a halogen gas of the composition $CH_3Br$. Additionally, the inner envelope 22 or 36 may have along with the selected fill-gas a halogen gas in the range of approximately 0.02% to 0.2% of the fill-gas and may be selected from the compositions of the group $CH_3Br$, $CH_2Br_2$, $CH_3I$, $I_2$ and HBr.

The 100W-48V and 150W-48V lamps of Table 5 contain a gas atmosphere of a relatively high pressure of 2200 Torr, within the inner envelope 22 or 36, comprised of approximately 83% xenon, 17% nitrogen and 0.1% of a halogen gas of the composition $CH_3Br$. The nitrogen gas improves the arc-out resistance of the lamps of Table 5. The lamp types 60W-26V, 75W-30V, 100W-48V, and 150W-48V of Table 5 have the corresponding active wire dimensions of Table 2.

The values 8678 and 2393 of the Life in Hours column of Table 5 associated with the 60W-26V and 75W-30V lamp types, respectively, are average values related to ten (10) lamps of each type for which life testing was performed. The values 3242 and 4067 of the Life in Hours column of Table 5 associated with the 100W-48V and 150W-48V lamp types, respectively, are median values related to ten (10) lamps of each type for which life testing was performed.

A comparison between Tables 4 and 5 of the corresponding wattage lamps reveals the improvements of the general service incandescent lamp 10 of the present invention which are tabulated in Table 6.

TABLE 6
GENERAL SERVICE INCANDESCENT LAMP IMPROVEMENTS

| Lamp Type | LPW (Efficacy) | Life in Hours |
|---|---|---|
| 60W-26V | 35.6% | 768% |
| 75W-30V | 48.7% | 219% |
| 100W-48V | 19.4% | 332% |
| 150W-48V | 16.2% | 442% |

It should be noted that in a manner similar to that described for Table 4, the L.P.W. and Life in Hour improvements are interrelated in that a reduction in the L.P.W. improvement causes a corresponding increase in the Life in Hour improvement for a specified wattage and voltage rating.

It should now be appreciated that the present invention provides a general service incandescent lamp with improved efficiency over typical incandescent lamps. Further, these efficiency improvements are achieved with a mechanically sturdy compact filament 24 along with improved lamp life.

Although the improvements realized by the 100W-48V and 150W-48V lamps are substantial, a preferred voltage range of operation for these 100W and 150W lamps is between 30 to 40 volts. Still further, the 60W and the 75W lamps preferably have an operating voltage in the range of 20 to 30 volts. Furthermore, it should be noted that all the voltage values given in described Tables 1, 2, 5 and 6 and the Tables 7 and 8 to be described, are equally applicable to those related to an alternating current (A.C.) type or direct current (D.C.) type.

As previously mentioned, the inner envelope 22 contains an efficient fill-gas selected from the group consisting of xenon, krypton, and argon. Of these three gases the preferred priority of selection is xenon (Xe), krypton (Kr), and then argon (Ar). To describe further the preferred selection between xenon and krypton, reference is now made to Table 7.

TABLE 7
GENERAL SERVICE INCANDESCENT LAMPS 10 HAVING VARIOUS FILL-GASES FOR A 75W - 27V TYPE USING A SINGLE COIL TYPE FILAMENT

| Volt | Watts | Lumens | L.P.W. | Life, Hrs. | Fill Gas | Halogen | Torr Pressure |
|---|---|---|---|---|---|---|---|
| 27 | 75.71 | 1670 | 22.06 | 5234 | Kr | 0.1% $CH_2Br_2$ | 2700 |
| 27 | 75.35 | 1674 | 22.22 | 5511 | Xe | 0.1% $CH_3Br$ | 2700 |

In a manner similar to that described for Table 5, the Life in Hours of the lamps of Table 7 having a xenon (Xe) fill-gas is the average life value of ten (10) tested lamps, whereas, the Life in Hours of the lamps of Table 7 having a krypton (Kr) fill-gas is the median life value of eight (8) tested lamps. A rough comparison between the L.P.W. and the Life in Hours columns of Table 7 reveals that the use of xenon fill-gas has approximately a 1% improvement in L.P.W. and a 5% improvement in life relative to the krypton (Kr) fill-gas. To describe further the priority of the selection of the inert fill-gases of xenon, krypton and argon, reference is now made to Table 8.

TABLE 8

GENERAL SERVICE INCANDESCENT LAMPS 10 HAVING VARIOUS FILL-GASES FOR A 75W - 30V TYPE USING A COILED-COIL FILAMENT

| Volts | Wattage | Lumens | L.P.W. | Life in Hours | Fill-Gas | Halogen Type | Torr Pressure |
|---|---|---|---|---|---|---|---|
| 30 | 73.53 | 1625 | 22.10 | 1897 | $Xe + 14\% N_2$ | 0.1% $CH_3Br$ | 2700 |
| 30 | 73.48 | 1602 | 21.81 | 1875 | $Kr + 14\% N_2$ | 0.1% $CH_2Br_2$ | 2700 |
| 30 | 75.35 | 1571 | 20.85 | 1756 | $Ar + 5\% N_2$ | 0.1% $CH_3Br$ | 3200 |

In a manner similar to that described for Tables 5 and 7, the Life in Hours of the lamps of Table 8 having the fill-gases $Xe+14\%N_2$ and $Kr+14\%N_2$ are average life values of eight (8) and seven (7) tested lamps respectively. The median life of nine (9) lamps of Table 8 having the fill-gas $Ar+5\%N_2$ was 1756 hours.

A rough comparison between the L.P.W. column of Table 8 reveals that the xenon type fill-gas affords approximately a 6% improvement over the argon type, and similarly, the kryton type fill-gas affords approximately a 5% improvement over the argon type.

The general service incandescent lamps of Table 8 and also of Tables 5 and 7, all representatively shown in FIG. 1, were experimentally constructed and processed. The filaments of Table 2 related to 60W-26V and 75W-30V type lamps were disposed into and pinch-sealed within a quartz type tube of 8 mm O.D., whereas, the filaments of Table 2 related to the 100W-48V and 150W-48V types were disposed into and pinch-sealed within quartz type tubes of 10 mm O.D..

The filaments of Table 2 within the confines of envelope 22 were first flashed in pure hydrogen at 700 Torr at approximately 60% of the design voltage. For example, a 48 volt filament had applied to it a voltage of approximately 30 volts. The flash in hydrogen removed the surface impurities of the filament. After flashing the filament and evacuating the envelope 22 or 36 to a vacuum of approximately $10^{-4}$ Torr a fill-gas was introduced at a relatively high pressure. In accordance with the hereinabove description, the fill-gas was selected from various types of gases, such as xenon, krypton or argon having mixtures of halogen gases and in some cases having a nitrogen gas additive. The fill-gas pressures used in these tubes ranged from 1500 to 5000 Torr at room temperature with a preferred range being 2000 to 3000 Torr. After freezing-in the desired amount of fill-gas with liquid nitrogen, the quartz tubes were sealed off and mounted in A-19 type outer bulbs.

The improvement in performance of the general service incandescent lamp of the present invention is obtained from the contributions from (1) an efficient fill-gas such as xenon, krypton, or argon, or mixtures thereof, all at a relatively high pressure with the fill-gas and the relatively high pressure both contributing to improving the operation of the filament 24 by reducing the tungsten evaporation of the filament, which, in turn prolongs the life of the filament, (2) the halogen gas atmosphere within the inner envelope 22 or 36 along with the fill-gas surrounding the filament 24, in which the halogen gas contributes to improving the operation of the filament 24 by providing a transport cycle that returns the evaporated tungsten from the wall of the envelope 22 or 36 back to the filament 24 keeping the walls of the inner envelope 22 or 36 clean, (3) the sturdy and compact incandescent light source provided by the mechanical structure of the filament 24, and (4) the filament 24 being effectively energizable for normal operating wattage rating at a reduced voltage while still improving the life and luminous characteristics of the lamp.

The voltage desired for the operation of the filament 24 of the present invention need only be marginally reduced relative to the typical 120 volt A.C. power source. More particularly, a marginally reduced voltage provides marginal improvements in lamp performance relative to the typical incandescent lamp operated at 120 volts A.C. and of the same wattage rating as filament 24, whereas, the voltage reduced to a value of 26V for a 60 watt type lamp produced a 35.6% L.P.W. improvement and a 768% in life extension as described for Table 6. It is desired that the 60 watt lamps of Table 6 be designed to operate in the range of 20 to 30 volts. Similarly, the operation of the 100W and 150W lamps described for Table 6 gives improvements of 19.4% in L.P.W. and 332% in Life in Hours for the 100 watt lamp and a 16.2% in L.P.W. and a 442% in Life in Hours for the 150 watt lamp. The preferred voltage range of the 100W and 150W lamps is between 30-40 volts.

The reduced A.C. or D.C. voltages relative to a typical 120 volt A.C. source which is applied across a filament 24 may be developed by various means. For example, an electrical transformer having the desired turn ratio for stepping down the voltage from 120V A.C. to a desired value, such as 30V A.C. for the 75W lamp of Table 5, may be selected to develop the voltage across filament 24 of the general service incandescent lamp of FIG. 1 which is adapted to receive the applied 30V A.C.

The total improvements of the general service incandescent lamp were beyond the expected gains anticipated from previous experience as usually realized from the individually contributing features. Further, the contributing features complement each other. For example, the low voltage filament 24 being of a relatively short length and a larger diameter wire which does not sag is advantageous in disposing in a chamber having a relatively small volumetric capacity, which, in turn, is advantageous in that a relatively small amount of the relatively expensive halogen, xenon, krytpon and argon gas is necessary to fill the chamber, which, in turn, provides a relatively inexpensive self-contained and rugged envelope 22, which, in turn, provides a rugged inner envelope having a low pressure volume (P·V) quantity advantageous from a safety viewpoint, which, in turn, provides a relatively inexpensive self-contained rugged and safety enhanced inner envelope 22, which, in turn, provides an overall effect of giving to the incandescent lamp art a relatively inexpensive high efficiency general service incandescent lamp 10 of FIG. 1.

While the invention has been particularly shown and described with reference to several preferred embodiments thereof, it will be understood by those skilled in the art that various changes in form and detail may be made therein without departing from the true spirit and scope of the invention as defined in the appended claims.

What I claim as new and desire to secure by Letters Patent of the United States is:

1. An improved general service incandescent lamp comprising:
   (a) an electrically conductive base;
   (b) an outer envelope hermetically sealed to said base;
   (c) an inner envelope spatially disposed within said outer envelope and containing a halogen gas and a relatively high pressure fill-gas selected from the group consisting of xenon, krypton, argon and mixtures of these inert gases; and
   (d) a tungsten filament spatially disposed within said inner envelope, said filament being specially adapted by having selected larger wire diameters and shorter wire lengths both relative to typical filaments so as to be effectively energizable for normal operating wattage rating at a reduced voltage relative to a typical household power source.

2. A general service incandescent lamp according to claim 1 wherein said filament is of a coiled-coil type and is spatially disposed in an axial manner relative to said lamp.

3. A general service incandescent lamp according to claim 1 wherein said filament is of a coiled-coil type and is spatially disposed within said inner envelope in a transverse manner.

4. A general service incandescent lamp according to claim 1 wherein said filament is a single coil type and is spatially disposed in an axial manner relative to said lamp.

5. A general service incandescent lamp according to claim 1 wherein said filament is a single coil type and is spatially disposed within said inner envelope in a transverse manner.

6. A general service incandescent lamp according to claim 1 wherein said relatively high pressure fill-gas is within the range of approximately 1500 to 7000 Torr at room temperature.

7. A general service incandescent lamp according to claim 1 wherein said relatively high pressure fill-gas is preferably within the range of approximately 2000 to 3000 Torr at room temperature.

8. A general service incandescent lamp according to claim 1 wherein said fill-gas further comprises a nitrogen gas additivite within the range of approximately 1 to 15%.

9. A general service incandescent lamp according to either claim 1 or claim 8 wherein said halogen gas is in the range of approximately 0.02% to 0.2% of the fill-gas and is selected from the group of compositions consisting of $CH_3Br$, $CH_2Br_2$, $CH_3I$, $I_2$, and $HBr$.

10. A general service incandescent lamp according to claim 1 wherein said general service incandescent lamp has a rating of 60 watts and said filament is energizable at its normal operating wattage by a voltage within the range of approximately 20 to 30 volts.

11. A general service incandescent lamp according to claim 1 wherein said general service incandescent lamp has a rating of 75 watts and said filament is energizable at its normal operating wattage by a voltage within the range of approximately 20 to 30 volts.

12. A general service incandescent lamp according to claim 1 wherein said general service incandescent lamp has a rating of 100 watts and said filament is energizable at its normal operating wattage by a voltage in the range of approximately 30 to 50 volts.

13. A general service incandescent lamp according to claim 1 wherein said general service incandescent lamp has a rating of 100 watts and said filament is energizable at its normal operating wattage by a voltage preferably in the range of approximately 30 to 40 volts.

14. A general service incandescent lamp according to claim 1 wherein said general service incandescent lamp has a rating of 150 watts and said filament is energizable at its normal operating wattage by a voltage within the range of approximately 30 to 50 volts.

15. A general service incandescent lamp according to claim 1 wherein said general service incandescent lamp has a rating of 150 watts and said filament is energizable at its normal operating wattage by a voltage preferably within the range of approximately 30 to 40 volts.

16. A general service incandescent lamp according to claim 1 wherein said inner envelope has a volumetric capacity in the range of approximately 0.33 to 5.0 cubic centimeters.

17. A general service incandescent lamp according to claim 1 wherein said inner envelope is formed of quartz material.

18. A general service incandescent lamp according to claim 1 wherein said inner envelope is formed of a glass material.

19. A general service incandescent lamp according to claim 1 wherein said inner envelope is of a double-ended type.

20. A general service incandescent lamp according to claim 1 wherein said inner envelope is of a single-ended type.

* * * * *